US010262350B2

(12) United States Patent
Peter et al.

(10) Patent No.: US 10,262,350 B2
(45) Date of Patent: *Apr. 16, 2019

(54) PERPETUAL COMMUNICATION SESSION: PORTABILITY/REUSABILITY ACROSS APPLICATIONS NETWORKS AND DEVICES

(71) Applicant: Ushur, Inc., Santa Clara, CA (US)

(72) Inventors: Henry Thomas Peter, Mountain House, CA (US); Dayanand Narasimha, Santa Clara, CA (US); Simha Sadasiva, San Jose, CA (US)

(73) Assignee: USHUR, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,318

(22) Filed: Aug. 6, 2018

(65) Prior Publication Data

US 2018/0342000 A1    Nov. 29, 2018

Related U.S. Application Data

(63) Continuation of application No. 14/612,256, filed on Feb. 2, 2015, now Pat. No. 10,043,204.

(60) Provisional application No. 61/934,797, filed on Feb. 2, 2014.

(51) Int. Cl.
*G06F 15/173* (2006.01)
*G06Q 30/06* (2012.01)
*H04L 29/08* (2006.01)
*H04L 12/58* (2006.01)

(52) U.S. Cl.
CPC ......... *G06Q 30/0613* (2013.01); *H04L 51/04* (2013.01); *H04L 67/141* (2013.01); *H04L 67/142* (2013.01); *H04L 67/146* (2013.01); *H04L 51/18* (2013.01)

(58) Field of Classification Search
USPC .............. 709/229, 206; 705/22, 2; 379/1.03
See application file for complete search history.

(56) References Cited

U.S. PATENT DOCUMENTS

| 6,085,242 | A  | * | 7/2000 | Chandra | G06F 17/30887 707/E17.115 |
| 6,898,631 | B1 | * | 5/2005 | Kraft | H04L 12/1831 379/1.03 |
| 2004/0064351 | A1 | * | 4/2004 | Mikurak | G06Q 10/087 705/22 |
| 2006/0026237 | A1 | * | 2/2006 | Wang | H04L 51/04 709/206 |

(Continued)

*Primary Examiner* — Thanh T Nguyen
(74) *Attorney, Agent, or Firm* — Lowenstein Sandler LLP

(57) ABSTRACT

A system with mechanisms that allow for creating, storing and resuming a session without being bound by time. In a system that allows for communication between parties when one of the parties has an account with the system whereas one or more others who are trying to reach this party do not, creating a session and allowing for the same users to come back to resume the session is enabled. Resuming the session by any of the associated parties to the session is supported, this session can be operated through various applications such as voice, video and chat, and be accessed in various networks such as the internet or the telephone network, as well as across devices such as web browsers, smart device apps, and mobile phones with SMs capability. The system supports porting and reusability of the session across networks, applications and devices.

6 Claims, 6 Drawing Sheets

(56) References Cited

U.S. PATENT DOCUMENTS

2009/0175331 A1* 7/2009 Karczewicz ......... H04N 19/176
　　　　　　　　　　　　　　　　　　　375/240.03
2014/0288945 A1* 9/2014 Boerner ............... G06Q 30/016
　　　　　　　　　　　　　　　　　　　705/2

* cited by examiner

PERPETUAL COMMUNICATION SESSION: PORTABILITY/REUSABILITY ACROSS APPLICATIONS NETWORKS AND DEVICES

CROSS REFERENCE TO RELATED APPLICATIONS

The present application is a continuation of, and claims priority to, co-pending U.S. patent application Ser. No. 14/612,256, the entirety of which is incorporated herein by reference. This application also claims the benefit under 35 USC 119(e) of prior U.S. Provisional Patent Application No. 61/934,797, filed Feb. 2, 2014, which is hereby incorporated by reference in its entirety.

BACKGROUND OF THE INVENTION

Field

In an online marketplace where users are looking for items or service, there is a need to communicate with providers through email, chat, voice and video. While the providers have an account with a system that supports such modes of interaction, the visiting users such as buyers need not have an account with the system, one that has been proposed (Utility application Ser. No. 14/607,034, Peter et al.) elsewhere. In such a system the visiting users may again want to re-engage with the providers or vice-versa. The proposed system here shall have the ability to persist sessions without any time limit and make it accessible through multiple networks like the internet and the PSTN for the users to re-engage with each other or even for a user to monitor or inquire things related to the session. This especially is very relevant in market places where the users are buyers and the provider is a merchant/seller although the invention is not limited to this environment.

Use of Terms

The terms—buyers, users and consumers are used interchangeably and refer to the same or similar entity. The terms—sellers, providers, producers are also used interchangeably and refer to the same or similar entity. Depending on the type of the online marketplace or social network or e-commerce website, these terms are changed as relevant in those contexts. As an example, an online dating site uses the term users to refer to its user base who are trying to connect with others. An online auction site like e ebay would use the terms buyers and sellers. An online marketplace connecting growers and bakers may use the term producers and consumers to its user community. This invention is applicable to similar users and not limited by the specific terms used to describe the users of the proposed system.

Description of the Related Art

Many marketplaces on the internet provide an environment where sellers of a service or a product can advertise their offering and prospective buyers can read thru the description of these products (examples like amazon.com, ebay.com, craigslist.org) and contact the sellers for further inquiries. However, in these environments the most common mode of interaction is email. In some cases, the seller publishes their phone number with the caveat that only serious buyers should contact them. Either we have a non-real-time interaction such as email where the actual email of the seller can be hidden today or we have a case where the seller has to publish the phone number contact and be concerned on spam calls to it. Moreover, the user (prospective client) If interested in immediate interaction with the buyer using the published phone number has to use their phone device whether landline or mobile to interact with the seller. The internet is progressing in that the web browser environment is being enhanced for real-time interactions via voice, video and data under the influence of html5. In this context it becomes much easier to provide these media (voice, video and data) via the browser without any special plug-ins, such as no flash will be required.

Most of the market places are focused on the products or services themselves, providers and consumers have accounts and any sort of communication is either via email, phone numbers and in some cases can offer chat programs with the providers. However, in these circumstances none of the solutions offer a persistent session between the users where even after the initial engagement the session continues for the users (say buyers and sellers) and they can re-engage and do so on a different mode of engagement as well, for example the buyer can engage on the session and make an outbound voice call to the seller and still keep the entire history of earlier exchanges. It is possible for a marketplace (U.S. Pat. No. 8,170,919 B2 May 2012 Barbour et al) to be created focused on the collaboration itself to be an essential ingredient and have tight integration of all activity that takes place between the users with the platform that hosts the products or services However what is targeted here in the proposed system is to focus on the people involved, the communication aspects between them, to make their sessions persistent independent of the marketplace itself although such a solution can also be tightly integrated with marketplaces.

What this invention proposed here, in one embodiment, is to persist the session context perpetually so that sessions can transfer from one medium to another spanning across networks (either internet or telephone network) and services (voice, video and text). Perpetual session id can also be re-used at a later time to connect with the same user without losing the context of prior interaction. This allows the users to get to the point where the conversation last ended and to pick it up from that point, especially if interaction gets discontinued due to network connectivity issues or if conversation requires multiple interactions at different times for a logical conclusion of the topic.

SUMMARY

A common session identity across all applications, networks and devices is achieved through a perpetual session identifier, implemented and stored in the communication core. This session identity is globally unique within the proposed system. The system is capable of storing and reusing the session indefinitely. Access to this session via a HTTP URL that also contains the session identity along with identifying the proposed system.

A system that supports interaction between users who are not in the same community or in other words who do not necessarily have an account with this system is proposed elsewhere (Utility application Ser. No. 14/607,034. Peter et al.). In such a system when the interactions are completed between the users that can be considered the end of that engagement. Here we propose a system that stores the engagement as part of a session that does not terminate even though the users complete their interaction. In such a proposed system the users of the session are informed about this session in the form of a session identity link and can resume the same session although as another engagement using application modes such as voice, video, chat or a combination thereof.

A user can start a chat message with another user and the network can create a perpetual session that encompasses this chat session. This perpetual session is then persisted in the core network of this system. The users will be informed via email as well as in the chat context itself about the perpetual session link. Now sometime in the future the user can click on that session link and arrive to this proposed system after which the user can engage with the other party via voice call. In another embodiment, a user from a web browser is engaging with another user in the telephone network via the proposed system. Assuming that the user in the telephone network has an account with the system, the moment this engagement starts and this being the first one, the session link is indicated to both the users to their email addresses. For the user on the browser, the session link can be indicated to the chat window so as to allow the user to copy that link and keep it elsewhere securely. If there is an interruption in the telephone service due to poor network conditions and the user on the web browser also terminates the session because of unavailability of the user on the other side, the user on the telephone network who had received the session link via email can click and join the persistent session in the proposed system which in turn can seek out the other user who is currently present to the system. Even if not, the system can indicate to the user via email about the session being sought after by another user trying to connect both the users with the session.

What was a call via PSTN Network now becomes a call via IP Network to a Web Browser across engagements. The context of the session is retained so that the users in this session can be made aware of all the past engagements and activities during those engagements. The entire engagement history for this perpetual session will be presented in a comprehensive manner to the users of the session. Although the session was originally created by a user (say a buyer was trying to reach a seller in the market) the session itself continues without any active user and based on certain features provided by the system can even continue to indicate to the users about ongoing information relevant to that session and allow for the users to join the session and continue the engagement with each other.

The various embodiments presented here as part of the proposal highlights the need and effectiveness of a perpetual session in context of interactions in online marketplaces where users are not constrained to a specific community.

In one embodiment a buyer tries to reach the seller through a HTTP URL and reaches the proposed system that immediately generates a new perpetual session identifier and informs the buyer about this link so as to revisit the same session in the future. This happens regardless of whether the buyer was able to connect with the seller of a product or service. In another embodiment the buyer is requested to fill in certain information including the email identifier after which the perpetual session identifier which is indicated to the buyer instantly on the engagement screen is also notified to the buyer's email.

Regardless of whether the seller is reached in real-time for this session, the seller will be notified of this new session that was initiated by this buyer. In one embodiment the buyer is unable to reach the seller in real-time and does not even leave a message but rather provides information such as email address. The seller who is being informed of this session, uses the session link to reach this proposed system that launches the seller with the engagement screen and allows the seller to initiate messages to the buyer. Here since the buyer did not leave any real-time information such as phone number, the system would be sending the seller's message via email.

In one embodiment the buyer who has reached the seller via the browser may continue with either chat or voice or a combination but the buyer may have to leave the device or the terminal and be forced to take the session over a phone call. Here the buyer can request the seller to initiate a voice call to his or her phone after a while. In this case the buyer either remains on the session or leaves the session and resumes later using the session identifier. After resuming with the session, upon which the buyer is notified, the seller can initiate a phone call to the buyer on the other side.

Perpetual user engagement is evaluated to see if it is associated with already existing session which can be found out based on how the users landed on the system. If they used a HTTP URL or hyperlink that did not contain a session identifier then this is a new session else it is a session that is resumed. The proposed system is capable of storing all the unique sessions in the system and able to retrieve them as and when needed. The persisted session must be associated with multiple URL such as one for each user so as to distinguish who the user is when they arrive at the system to access the session.

In one embodiment the users in the system are given the option to completely remove the sessions but this will depend on the specific permissions for each of the users in the session. A system that implements the proposed mechanisms here can choose to have various features associated with terminating sessions.

While most of the embodiments presented here are marketplaces scenarios the proposed system can be used in other situations including party events, fundraisers, and in social media advertising and also in normal conversations where users have a smart device App that aggregates all their sessions and the context with which the users can resume any of those sessions. The proposed system with its mechanisms also are independent of the market places themselves and do not have to be tightly integrated with any marketplace systems although that is a possibility.

BRIEF DESCRIPTIONS OF DRAWINGS

[201] represents an embedded hyperlink reference for the session although this one starts with the chat mode.

[201] is the actual link address which is the perpetual session identifier. This is the actual address that is used to come back to the session with its entire conversation history. What is presented here is only one example of how an identifier can appear.

Figure 3:
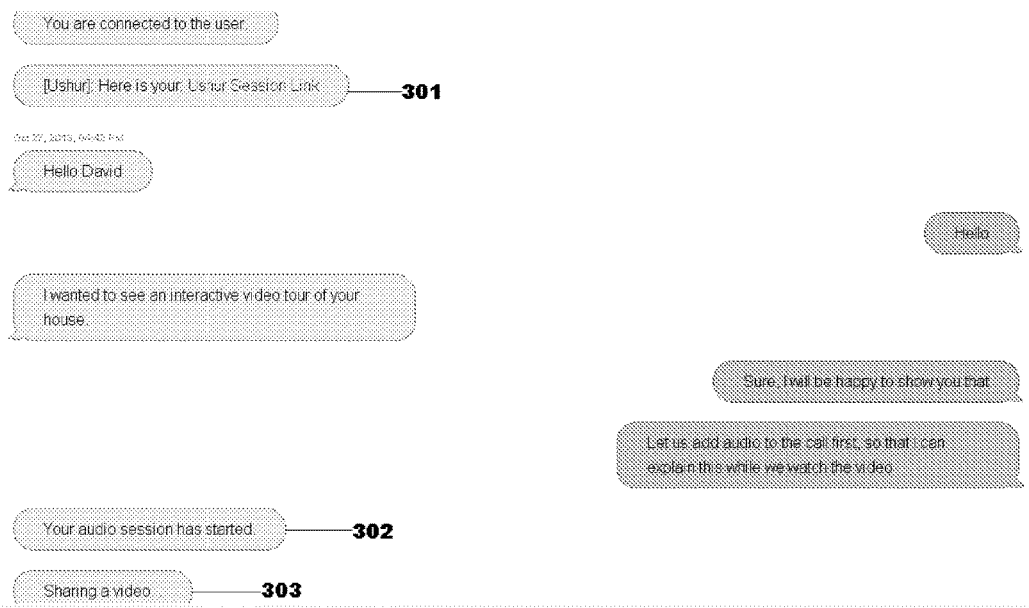

FIG. 3 illustrates a session having been retrieved by clicking on its session identifier reference.

[301] represents an embedded hyperlink reference for the session which has been resumed here.

[302] is a link to the audio conversation. Clicking this link can fetch further details of the audio conversation within the session. Note however it is only the [301] that is the perpetual session identifier that refers to the entire session whereas others like [302] [303] are internal links used to refer to further details of the conversation is a link to the video conversation. Clicking this link can fetch further details of the video conversation within the session.

Figure 4A:
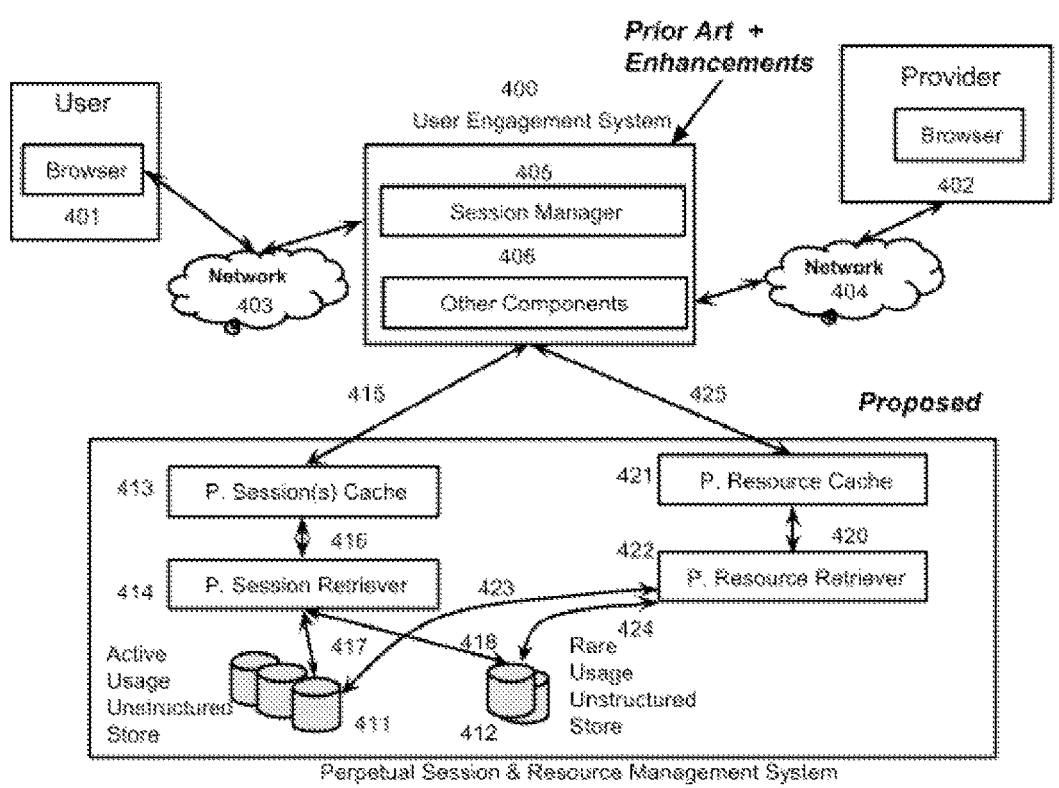

FIG. 4A [410,415,425] is one embodiment of the implementation of the invention.

[415] captures the interaction between the existing user engagement system and the proposed perpetual session management system.

[425] captures the interaction between the existing user engagement system and the proposed perpetual resource management system.

[413] indicates the cache for the perpetual, session.

[416] indicates the interaction involved in getting the perpetual session from a store when not present in the cache.

[414] indicates the component that retrieves the perpetual session when needed.

[417] indicates the retrieval of the perpetual session from an active unstructured data store [411].

[418] indicates the retrieval of the perpetual session from a rarely used unstructured data store [412].

[420] indicates the interaction involved in getting the perpetual resource from a store when not present in the cache.

[421] indicates the cache for the perpetual resources.

[422] indicates the component that retrieves the perpetual resources when needed.

[423] indicates the retrieval of the perpetual resource from an active unstructured data store [411].

[424] indicates the retrieval of the perpetual resource from a rarely used unstructured data store [412].

[426] indicates the persistent resource manager that comprises the resource cache 421 and the resource retriever 422.

Figure 4B:
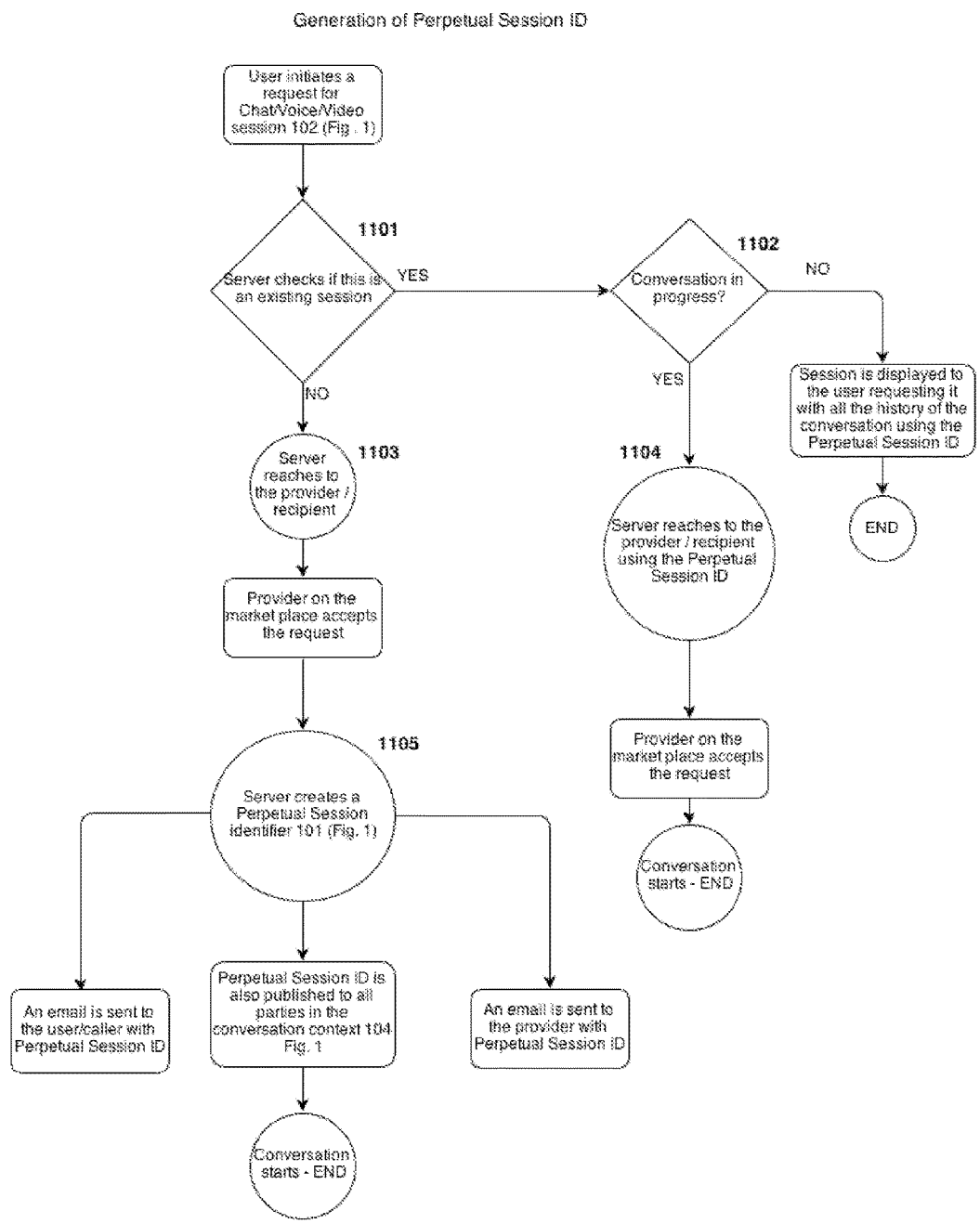

FIG. 4B illustrates a detailed session creation.

[1101] refers to the mechanism involved in the system to identify if this session is a new one or an earlier one being resumed.

[1102] identifies the mechanism of finding out if this session is in progress implying that the parties in this session are available so as to actively resume the session.

[1103] and [1104] refers to the reaching of the other party which is the provider of a service. While [1103] is in the context of a new session, [1104] occurs in a resumed session.

[1105] occurs for a new session which in turn has a perpetual session identifier created and is distributed to the parties through various modes such as Email, in the conversation windows and other means.

Figure 5:
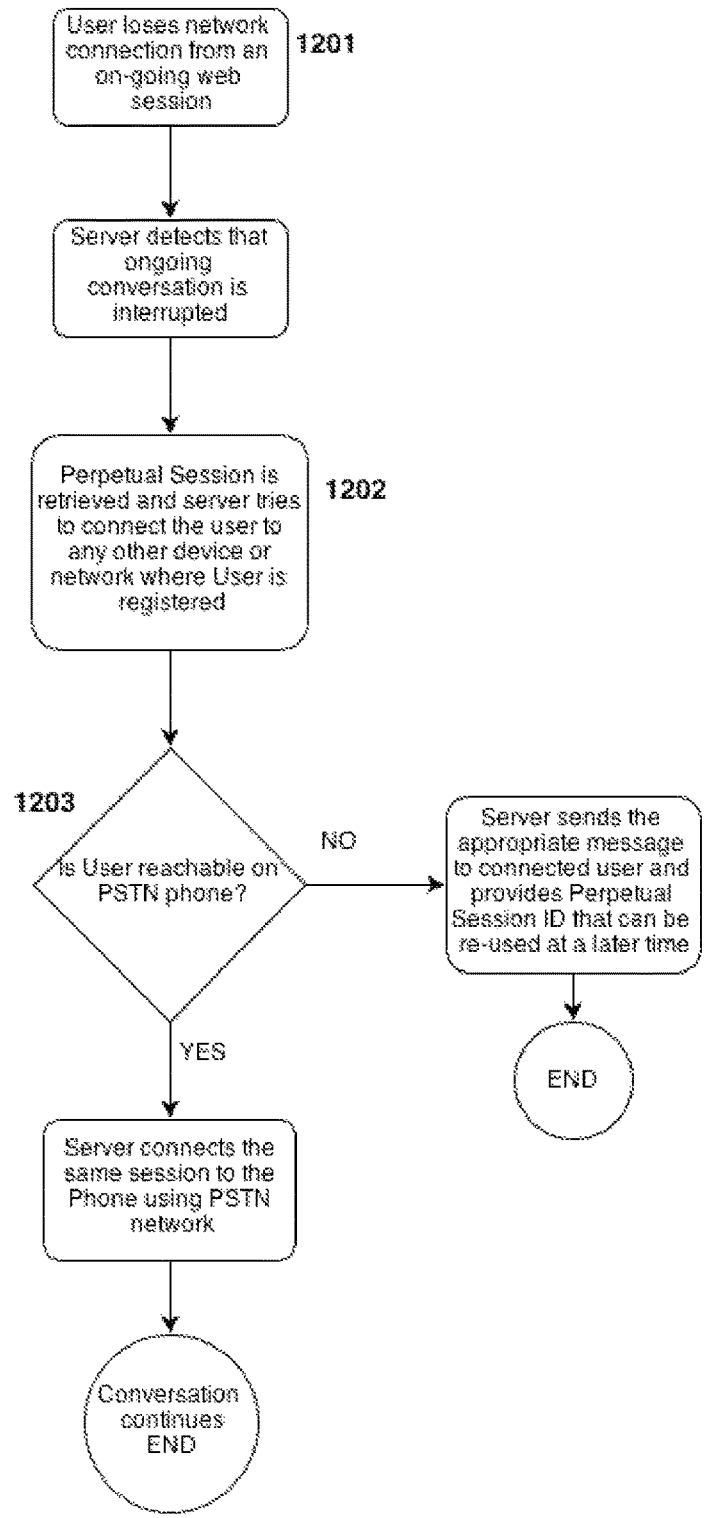

FIG. 5 illustrates a session re-establishment flowchart for a transition from one network or device to another.

[1201] represents a user's web connectivity loss by virtue of a network problem or a logout

[1202] involves the mechanism of fetching the existing session using the perpetual session identifier. This also arrives at the actual network and device to be reached to based on where the session last halted.

[1203] is the identification that the last mode was a PSTN call with the other party and hence to resume there. [1203] involves trying to connect via the PSTN network to the other party. If the parties cannot be connected then an offline logic is executed that can involve notifying the parties on the session identifier and that it could not resume the connection.

Figure 6:
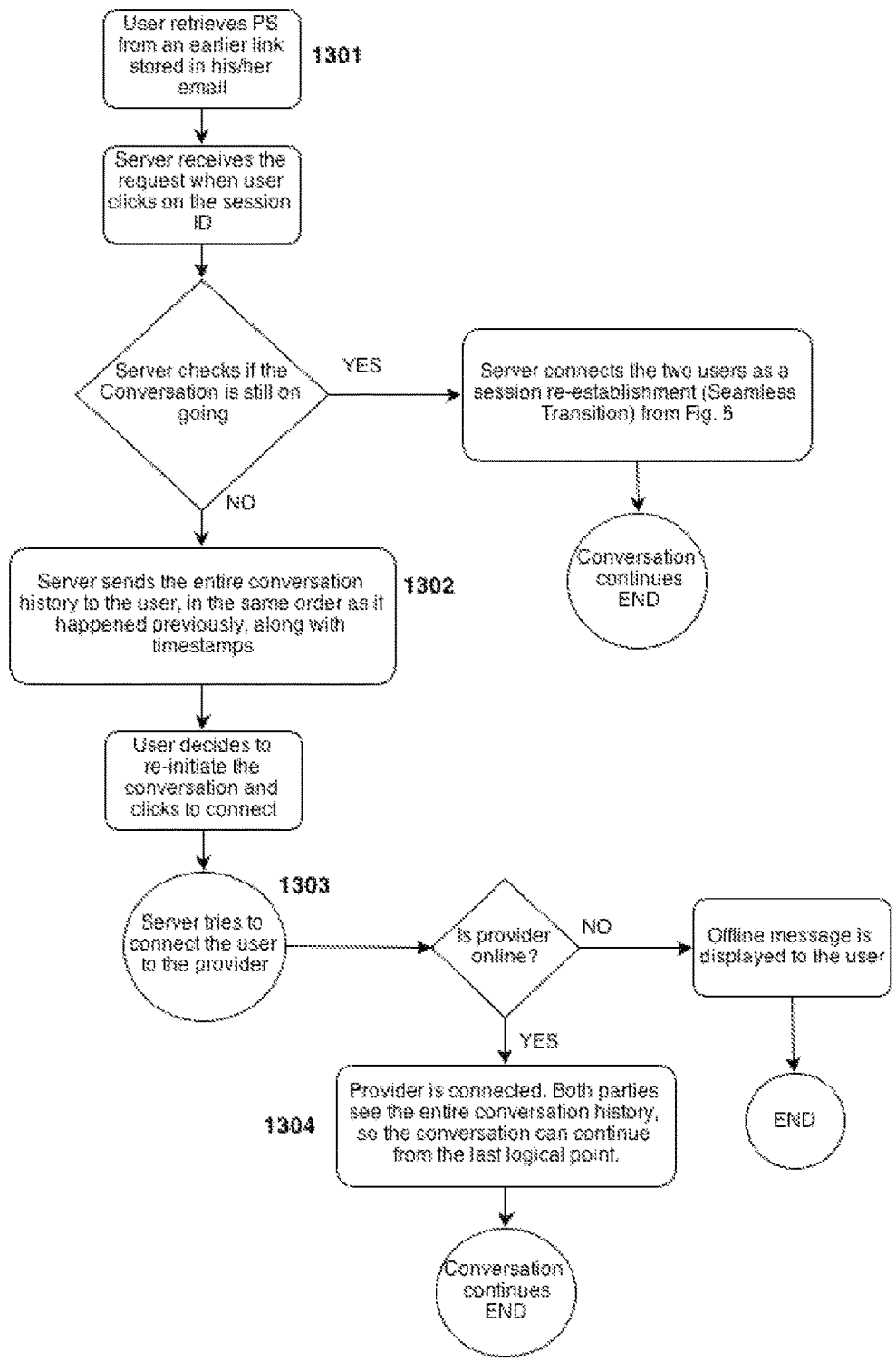

FIG. 6 illustrates retrieval of older conversations from session history using the Perpetual Session Identifier.

[1301] indicates user retrieving the session ID from a stored location such as email and clicking on that link.

[1302] represents server sending the entire conversation history of a retrieved perpetual session.

[1303] represents a server attempt to connect to the provider (seller) in the perpetual session

[1304] represents a re-use and re-establishment of conversation based on a Perpetual Session ID with entire history of earlier conversations.

The figures here depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

While there are applications that connect users in a community with the history of a chat session appearing in multiple devices running the same application, it is indeed limited to a user community and chat applications. In this invention where there is no necessity of a community between the parties in the session such as buyers and sellers not having to be in a common community, focus is on an endless session that encompasses all modes of communication and the ability to store and retrieve chat, voice, video or any other information exchange that happened in the context of a previous session. By generating a unique HTTP URL for the session as well as for the specific mode of interaction such as voice, video, chat and other assets involved in the engagement and being able to associate this with the persistent session and resources over a period of time, a rich interaction is made possible in a given setting. In this embodiment, we will discuss storing such a rich media interaction with a session identifier that can be used at a later time to retrieve the information from the server store.

Figure 1:
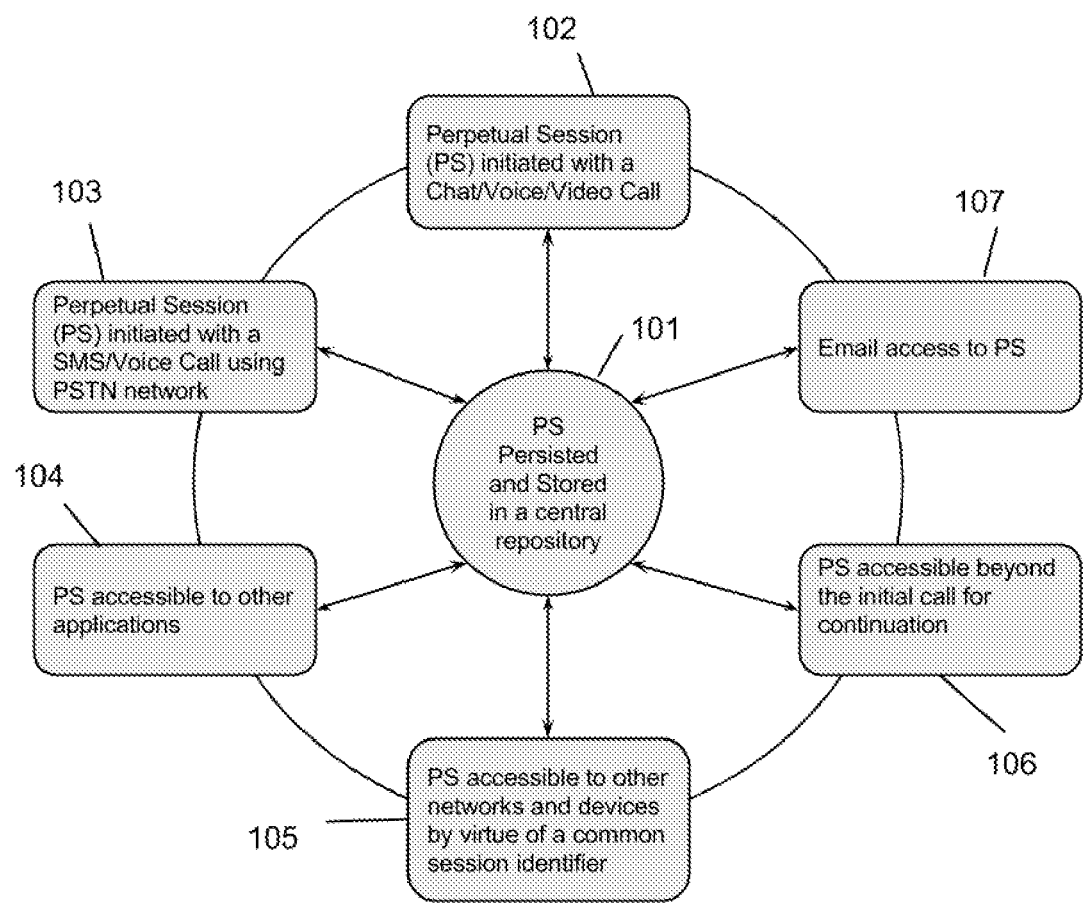
FIG. 1 illustrates the creation and usage of the perpetual session in the proposed system. What is presented is a central server repository that contains all references to a single session that can encompass multiple modes of communication across multiple devices and networks.

As illustrated in FIG. 1, the session identifier is used to store the entire session history in the central repository 101 that can be retrieved any time in the future or restored from a previous information exchange in cases of network failures resulting in communication disconnects. In one embodiment, session can start with 102 which is a chat or voice or video call whenever the user being reached is online on the server platform. If the user is offline or if there are network issues that disrupts ongoing communication between the two users, then session can automatically switch to 103 which is a PSTN based SMS or voice call. In another embodiment, session can start with 103 and later transition to 102. The server uses perpetual session identifier to re-connect the two users. At the same time, user's PSTN identity is masked by the server session identity.

This way, server can keep the same session identifier and use it across 104 and 105, which gives it flexibility to be ported or transformed to multiple applications, networks and devices without losing context of an ongoing communication. Server maintains the session beyond the initial call as well as for re-use and retrieving history of the session at a later time as shown in 106. This greatly helps in jumping back into the previous context of such an on-going and perpetual session and provides an easy continuity to conversations. Such sessions can also be sent over electronic mail formats (email) as shown in 107 with either a link to join the session or a detailed report of the entire conversation. While we talk about a perpetual session identity that gets created 102 for an initial session and gets stored 101 so as to be retrieved later when the session resumes, in reality in order for the system to recognize the user (say whether buyer or seller in a marketplace), there will be different session identity that gets generated and be notified to the user. A buyer will have a different perpetual session identity when compared to the identity that the seller would be notified. Both these identity will be referring to the same perpetual session however. This mechanism is necessary rather than having some URL parameters for the sake of security. It should not be possible for one user to pretend as another by changing the parameters in the URL and hence we need to generate different identity for each party in the session although all pointing to the same perpetual session. This mechanism is now assumed and will not be mentioned repeatedly in this document when we speak about perpetual session identity.

Figure 2:
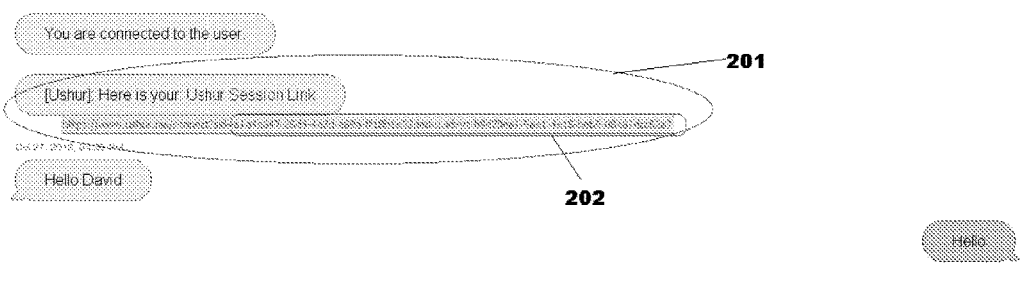
FIG. 2 illustrates a live example of the instantiation and exposure of the perpetual session identifier. The users in the session are informed of this session identifier.

FIG. 2 illustrates an embodiment where a session is started either in the form of 102 or 103 and server (101) generates a unique session identifier as part of the initial session establishment. The session identifier is then presented to the users in their conversation window using a hyperlink which is shown in 201. Such a hyperlink points to a persistent session in the server as shown in 202. Either of the parties involved in the conversation can click this persistent session link (which can be different for each user) in the event of a communication loss resulting from network issues or going out of the service platform where communication exchange was taking place. Upon clicking the session link shown in 202, users will be able to jump back into the previously interrupted conversation.

FIG. 3 illustrates an embodiment of a retrieved session from a previous conversation. Since server maintains the session identity perpetually, it enables such a retrieval from either of the parties involved in the communication by clicking on the hyperlink given in 201 or shown again in 301. Going through the history of that conversation, one can very quickly get to the point where the conversation can logically continue from its previous stage without having to spend much of the time. In one embodiment, user can retrieve a previously stored audio conversation by clicking 302. Yet in another embodiment the retrieved information on the audio conversation can only indicate properties such duration of the audio conversation, codec employed, quality assessed, etc., but not the actual content of the audio which may not have been stored. On the same lines, a user can also retrieve a previously shared video and/or its properties by clicking on 303.

FIG. 4A illustrates how the proposed system with its various components is used to provide perpetual attribute to the session in an user engagement system 400 that already exists. An existing 1 User engagement system 400 offers session 405 oriented communication between its users 401, 402. However, this session will start and end with the interaction between the users 401, 402. With the proposed system 410 the same session can be persisted beyond the initial interaction and can be retrieved at some time in the future to resume for further engagements. While the system 400 is per engagement, the proposed system 410 allows for various engagements on the same session that was initiated once. If the users 401,402 so choose to re-engage as a new session they could in one embodiment. They simply have to connect via the user engagement system 400 without using a perpetual session link offered by the proposed system 410 in one embodiment the user 401 connects with the user engagement system 400. This user engagement system will interact 415 with the proposed system which will generate a new perpetual session identifier. The user engagement system 400 should inform 415 the proposed perpetual session management system on the link that the user 401 used to arrive at the user engagement system 400. The system 410 understands that there was no perpetual session link in this engagement and hence generates a new perpetual session identifier 201 and gives it back to the 400 via the 415. As part of this interaction 415 the system 400 will notify the content which is the perpetual session identifier to the user 401. Now the user engagement system 400 will reach the user 402 and also inform that user 402 about the perpetual session identifier 301. In another embodiment where based on the user 401 and the means they arrived to the user engagement system 400 it can be chosen not to support perpetual sessions in which case there will not be interactions 415 and hence no generation of perpetual session identifiers and hence no session information 201, 301 to the users. This shows that the user engagement system 400 can exist without the proposed system 410 and not offer perpetual sessions. As part of the session the system 400 can provide all the engagement details such as chat content, audio content and/or details including duration, codec used, quality that was assessed, video engagement, etc., via 425 interactions with the system 410. The perpetual session information 413 and the resource information 421 shall be persisted in the active store 411 for a certain duration beyond the user engagements. If these stored data are not used for a while they shall be moved into the other storage 412 for later usage. In one embodiment the user 402 uses the perpetual session link 301 at a later point in time, the user engagement system 400 checks 415 with the proposed system 410. There is no session in the cache 413, the session retriever 414 does not find (417) the session in the active store 411 but finds it in the rare store 412 via 418. The retrieved session is given back via 416 and 415 interactions. Then the user 402 is able to see the entire session and the history and is able to reach the 401 user using the user engagement system 400. Although the user engagement system 400 itself is not proposed here but there will be some enhancements expected in such a system to use the session information retrieved 415 as well as the resource retrieved 425. In one embodiment while the perpetual session link 201 generated for each users can have a common URL with different parameters to identify the users when they come back, it another embodiment a particular implementation can generate unique short form URL without any parameters and that short URL can again internally map to a longer set of parameters that identify the users along with other set of information. The longer form of URL with parameters exposed to users and network will be prone to manipulation whereas shorter form URL is not to that degree. Assume a user on a PSTN network lost the connectivity and need to rejoin the session, they can dial back the number (belonging to the user engagement system) from which they were reached. Upon dialing back they will be brought to the user engagement system 400 which will be responsible for mapping that phone call (based on the remote and local phone number) to the session for which the session URL will be retrieved by the user engagement system if stored in memory. If not the user engagement system 400 can inquire the proposed system 410 here which can detect the session URL based on the properties of phone number and any other session properties available. This highlights that while the proposed system has independent characteristics there will be some aspect to be supported in a user engagement system 400 that tries to leverage the proposed system 410.

FIG. 4B illustrates a flowchart for one embodiment of the invention above. It describes the flow for Perpetual Session creation. A session request is initiated by the user as shown in 102. This request is intercepted by the server, 1101. If this is a session already persisted on the server, it is taken as a re-establishment request 1102. If this is a new session request, server tries to connect the user to the requested provider/seller as in 1103. If user is online on one of the registered devices, server creates a Perpetual Session Identifier as shown in 1105 for this new request. Server then publishes this session id to both users who are connected in the session. A session notification email is also sent out so that users can store them and reuse them. Server stores all associated properties of the session using this single Session ID that is perpetual. If a session already exists and conversation was interrupted due to a network connectivity issue or if user is trying to add another person to the conversation, server uses the perpetual session identifier to retrieve all the existing conversation history for the session and present the same to users. It also connects all users to the service using the same perpetual session id as shown in 1104.

FIG. 5 is a flowchart detailing the use of Perpetual Session to re-establish a lost connection and to transition the conversation from one device/network to the other where user has transitioned into. Let us take the example of an established web-based chat session. When users are in a conversation, one of the users gets disconnected from the web session as shown in 1201. Server detects the connectivity loss. However, server has a registration for the user with a PSTN phone number. With the use of Perpetual Session, server then tries to connect with the user who transitioned out of the web session via the PSTN phone number, which is SMS based as shown in reference numeral 1202. In another embodiment, the same can be taken as an on-going voice conversation. When user transitions out of web session shown in 1201, server will then try to re-establish the voice connection with PSTN phone as shown in 1202. For the other user who stays connected, this transition is completely transparent. If server succeeds to connect the transitioned user as in 1203, conversation continues. If the reachability check in 1203 fails, server can provide a message to the connected user about such a connectivity loss which is now considered an offline message However, the invention enables server to maintain the conversation history in the Perpetual session which can be retrieved any time in the future.

FIG. 6 extends the above flowchart of FIG. 5, to describe the flow of a session retrieval using the Perpetual Session ID. When user decides to retrieve an older conversation, the user starts by retrieving the session ID previously published by the server. If the web or phone session is no longer available by virtue of closing or deleting the conversation, the example uses an email where Perpetual Session link is stored (1301). When user clicks on the session link, the request is sent to the server. Server first checks to see if the conversation is still on-going. If so, it is considered as a re-establishment of a lost connection and the flow shown in FIG. 5 is followed to re-connect the two users. If conversation has ended, server sends the entire session history to the user along with links to retrieve any voice and video interactions that happened in the previous conversation(s) using the same perpetual session identifier as shown in reference numeral 1302. Upon receiving this history, user should have an ability to request are-engagement or continuation of the conversation with the help of perpetual session id. When requested, server tries to see if the provider (other user) being contacted is online, as shown in numeral 1303. If provider is online, then server will connect the two users as described in 1304 and also send this history to the provider. Conversation can then continue between the users with the same Session ID. This way, users will never lose the context of previous conversations and interrupted conversations can resume very easily from the last logical end point. If provider is unreachable, server will display an offline message to the user trying, but the user will still be able to see the previous conversations, as long as the perpetual session id is maintained.

There may be a need for manual or administrative way of destroying such perpetual session ids by the administrator managing the server. This can be driven by automated policies of a fixed duration of time to preserve history or even based on some mutual agreements between the buyers and sellers on online marketplaces offering this service.

In another embodiment based on certain deployments and customer needs it may be possible for the users to completely erase the session history. In another embodiment a user may be allowed to delete only their own part in the session whereas the other user(s) can still be able to retrieve the information that belongs to them.

While perpetual session enables users to endlessly keep track of their conversation history, it extends on the idea of using a single HTTP identity for multiple modes of communication in any user space, be it a marketplace or a social network. The same perpetual session identifier can also be shared among other users to bridge into an ongoing conversation (conferencing).

In another embodiment a perpetual session can be associated with certain feature set, wherein the features are active even without the users in the session. One such feature can be that which monitors if the users are reachable and connect them. Here we see that the (re) engagement between users was not because of a user initiating via a shared session link but by the session residing in the network. The feature set itself can be associated with the session through user's input or based on dynamic aspects of the session such as user's not being able to reach the other live and hence the proposed system has the ability to associate relevant features to the persistent session.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of the perpetual session and resource manager 413, 414, 421, 422, and so forth may be provided in many or one module. Some of the functions of the proposed system 410 may have to be applied on the session manager 405 of an existing system.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "clicking" or "texting" or "selecting" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, the computers referred to in the specification may include a single processor or may be architectures employing multiple process or designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A perpetual session manager system that is capable of analyzing an input session URL, to find if such a session can be detected in its memory or from a persistent store, to retrieve such a perpetual session for a user, or to generate a new one for the user if none can be found, the system comprising:
   a persistent session cache that is able to create and manage a communication session and its related information in the cache;
   a session cache with a URL analyzer that can either find all the parameters in the URL itself and identify the relevant session or support another mapping of a shorter session URL to a longer URL form and then find additional information using a URL mapping mechanism that is stored in the cache as well as in a persistent store,
   the session cache further detecting the existence of a perpetual session identifier for the conversation or for generating a new perpetual session identifier if one does not exist;
   a session retriever for controlling access to the session cache based on frequency of use and for moving the session cache to an actively used store when frequency is at least a predetermined amount,
   the session retriever further moving the session cache to a rarely used store when the frequency of a session access is a predetermined lower frequency; and
   a session manager for executing various other policies including controlling the lifetime of the session, associating various other features to the stored sessions, including monitoring for some user events, and for invoking the session and connecting users to it;
   wherein the session manager further enables the users to change the attributes of said perpetual session so that they can be retrieved for information gathering but cannot be used for future engagements; and
   wherein the session manager further enables the users to completely remove the perpetual session information so that, after this has been done, the users can no longer engage with and through the session history but rather must engage as a new session which itself may or may not lead to a perpetual session.

2. The system of claim 1 wherein the session manager further is enabled to present to a user the entire history of an older conversation between two or more users and enable the user to re-establish the conversation from where the users previously left off.

3. The system of claim 1 wherein the session manager further is enabled to provide privacy to the users in the conversation by preventing the users' identity or mode of access to be revealed to other users unless explicitly authorized by the involved users.

4. The system of claim 1 wherein the session manager further is enabled to send and receive emails when users are offline and to present to a user the history of a perpetual session conversation and to enable users to continue to converse over email by responding to the session manager which translates said perpetual session conversation using the identifier and contacts the right user for continued conversation.

5. The system of claim 1 wherein, based on the URL that the user may initially use to arrive at the system, a session will not be allowed regardless of whether any information is embedded in that URL or found out by a mapping from the URL where the mapping is provided by the system.

6. The system of claim 1 wherein the session manager is able to continue the conversation between two users, one on email and another on chat, without forcing users to switch to the mode of the other user.

* * * * *